United States Patent
Hsiao et al.

(10) Patent No.: US 11,494,040 B2
(45) Date of Patent: Nov. 8, 2022

(54) STACKING STRUCTURE AND TOUCH SENSOR USING SAME

(71) Applicant: Cambrios Film Solutions Corporation, Tortola (VG)

(72) Inventors: Chung-Chin Hsiao, Hsinchu County (TW); Siou-Cheng Lien, Miaoli County (TW); Yi-Wen Chiu, Taoyuan (TW); Chi-Fan Hsiao, Taoyuan (TW)

(73) Assignee: Cambrios Film Solutions Corporation, Tortola (VG)

( * ) Notice: Subject to any disclaimer, the term of this patent is extended or adjusted under 35 U.S.C. 154(b) by 0 days.

(21) Appl. No.: 17/225,530

(22) Filed: Apr. 8, 2021

(65) Prior Publication Data
US 2022/0326807 A1    Oct. 13, 2022

(51) Int. Cl.
*G06F 3/044* (2006.01)

(52) U.S. Cl.
CPC .. *G06F 3/0445* (2019.05); *G06F 2203/04103* (2013.01)

(58) Field of Classification Search
CPC .... G06F 3/04164; G06F 3/0443; G06F 3/044; G06F 3/0446; G06F 2203/04111; G06F 2203/04102; G06F 2203/04112
See application file for complete search history.

(56) References Cited

U.S. PATENT DOCUMENTS

| | | | |
|---|---|---|---|
| 2016/0103520 A1* | 4/2016 | Kim | G06F 3/0446 345/174 |
| 2019/0243491 A1* | 8/2019 | Tsai | G06F 3/04164 |

FOREIGN PATENT DOCUMENTS

| | | |
|---|---|---|
| JP | 2014081939 A | 5/2014 |
| KR | 1020170113033 A | 10/2017 |

OTHER PUBLICATIONS

"Development of Transparent Conductive Film Using Nano-Level Ultrafine Silver Wire", Apr. 2015, Starting with the use of Touch Panels, we are Developing Applications for New Optical Composite Materials, Reprinted from the Internet at: https://www.dnp.co.jp/news/detail/1187549_1587.html, 6 pgs.

* cited by examiner

*Primary Examiner* — Deeprose Subedi
(74) *Attorney, Agent, or Firm* — Cooper Legal Group, LLC

(57) ABSTRACT

A stacking structure includes a substrate, a silver nanowire layer provided on a top of the substrate, and a metal layer provided on a top of the silver nanowire layer. The silver nanowire layer includes a plurality of silver nanowires and an indium tin oxide (ITO) covered on the plurality of silver nanowires. The silver nanowire layer has an overall thickness that is 2.35 to 24 times as thick as a thickness of the ITO. A touch sensor including the above described stacking structure is also disclosed.

20 Claims, 4 Drawing Sheets

STACKING STRUCTURE AND TOUCH SENSOR USING SAME

BACKGROUND OF THE DISCLOSURE

1. Field of the Disclosure

The present disclosure relates to a stacking structure and more particularly to a stacking structure including a silver nanowire layer. The present disclosure also relates to a touch sensor and more particularly to a touch sensor that includes the above-mentioned stacking structure.

2. Description of the Related Art

A stacking structure including silver nanowires and metal layers can be applied to the manufacturing of a touch sensor. Conventionally, surfaces of the silver nanowires in the stacking structure are covered with a protective layer, which is formed of a nonconductive resin and mainly used to protect the silver nanowires from scratches and peeling and to enhance the adherence between the silver nanowires and a substrate of the stacking structure. Since this protective layer is to be permanently attached to the substrate and the surfaces of the silver nanowires, the protective layer must have some optical characteristics like high transparency, low haze, and low b*, so as to satisfy the optical properties required by the visible area of the touch sensor.

Further, since the protective layer is to be permanently attached to the surfaces of the silver nanowires, the thickness of the protective layer plays a critical factor in the efficiency of etching the silver nanowires during the etching process. Besides, the protective layer often requires an etchant with high etch selectivity due to the protective layer being formed of a resin. Further, the protective layer tends to result in high contact impedance and poor electrostatic discharge (ESD) prevention due to the protective layer being formed of a nonconductive resin.

BRIEF SUMMARY OF THE DISCLOSURE

An objective of the present disclosure is to provide an improved stacking structure and a touch sensor including the same, so as to overcome the problem in the conventional stacking structure in which the protective layer, formed of a nonconductive resin, tends to cause high contact impedance and low electrostatic discharge (ESD) prevention.

To achieve at least the above objective, the stacking structure according to the present disclosure includes:
a substrate;
a silver nanowire layer provided on a top of the substrate; and
a metal layer provided on a top of the silver nanowire layer;
wherein the silver nanowire layer includes:
a plurality of silver nanowires; and
an indium tin oxide (ITO) covered on the plurality of silver nanowires; and
wherein the silver nanowire layer has an overall thickness that is 2.35-24 times as thick as a thickness of the ITO.

In the above stacking structure, the overall thickness of the silver nanowire layer can range from 40 to 120 nm.

In the above stacking structure, the thickness of the ITO included in the silver nanowire layer can range from 5 to 17 nm.

In the above stacking structure, the silver nanowire layer has a sheet resistance ranging from 5 to 100 ohms per square (ops).

The above stacking structure may further include:
a second silver nanowire layer provided on an underside of the substrate; and
a second metal layer provided on an underside of the second silver nanowire layer;
wherein the second silver nanowire layer includes:
a plurality of silver nanowires, and
an indium tin oxide (ITO) covered on the plurality of silver nanowires; and
wherein the second silver nanowire layer has an overall thickness that is 2.35-24 times as thick as a thickness of the ITO of the second silver nanowire layer.

To achieve at least the above objective, the touch sensor according to the present disclosure includes the above described stacking structure.

In the above touch sensor, the silver nanowire layer and the metal layer of the stacking structure can be patterned.

The above touch sensor may include two layers of the above described stacking structure, and all the silver nanowire layers and the metal layers of the stacking structures can be patterned.

In the above touch sensor, the silver nanowire layer, the second silver nanowire layer, the metal layer, and the second metal layer in the stacking structures all can be patterned.

The stacking structure and the touch sensor of the present disclosure show reduced contact impedance, good ESD prevention, and upgraded tolerance in the reliability analysis (RA) without adversely influencing the optical conditions thereof.

DETAILED DESCRIPTION OF THE DISCLOSURE

To facilitate understanding of the objects, characteristics, and effects of this present disclosure, embodiments together with the attached drawings for the detailed description of the present disclosure are provided. A person of ordinary skill in the art can understand the advantages and benefits of the present disclosure from the contents of the specification. It is noted the present disclosure can be implemented or applied in other embodiments, and many changes and modifications in the described embodiments can be carried out without departing from the spirit of the disclosure, and it is also understood that the preferred embodiments are only illustrative and not intended to limit the present disclosure in any way.

In the specification and the appended claims, the use of the singular form of a word indicated by "a" or "the" shall construed to include the plural unless the context indicates otherwise.

In the specification and the appended claims, the use of the term "or" includes the meaning of "and/or" unless the context indicates otherwise.

First Embodiment

Figure 1:
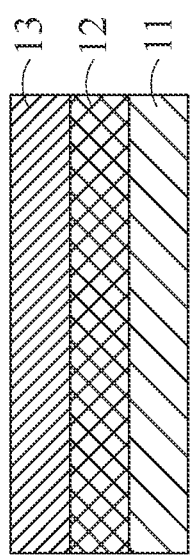
FIG. 1 is a schematic sectional view of a stacking structure according to a first embodiment of the present disclosure.

FIG. 1 is a schematic sectional view of a stacking structure 10 according to a first embodiment of the present disclosure. As shown, the stacking structure 10 in the first embodiment includes a substrate 11, a silver nanowire layer 12 provided on a top of the substrate 11, and a metal layer 13 provided on a top of the silver nanowire layer 12. The silver nanowire layer 12 includes a plurality of silver nanowires and an indium tin oxide (ITO) covered on the plurality of silver nanowires.

In the stacking structure 10 according to the first embodiment, the silver nanowire layer 12 has an overall thickness that is 8 times as thick as a thickness of the ITO (e.g., 40 nm:5 nm). However, it is understood that the present disclosure is not limited thereto. In some embodiments, the silver nanowire layer 12 is 2.35 to 24 times as thick as the ITO. Herein, the phrase "overall thickness of the silver nanowire layer" means a total thickness of the silver nanowire layer 12, including a thickness of the plurality of silver nanowires and the thickness of the ITO.

In the stacking structure 10 according to the first embodiment, the substrate 11 is made of a polyethylene terephthalate (PET). Other suitable materials for the substrate 11 include, but are not limited to, cyclic olefin copolymer (COP), Colorless Polyimide (CPI), and ultra thin glass (UTG).

In the stacking structure 10 according to the first embodiment, the overall thickness of the silver nanowire layer 12 is 40 nm. However, the present disclosure is not limited thereto, and in some embodiments the silver nanowire layer 12 has an overall thickness ranging from 40 to 120 nm.

In the stacking structure 10 according to the first embodiment, the silver nanowire layer 12 has a sheet resistance being controlled to be 50 ohms per square (ops). However, it is understood that the present disclosure is not particularly limited thereto, and in some embodiments the sheet resistance for the silver nanowire layer 12 ranges from 5 to 100 ops.

In the stacking structure 10 according to the first embodiment, the metal layer 13 is made of a copper material. However, the present disclosure is not limited thereto. Other suitable materials for forming the metal layer 13 include, but are not limited to, molybdenum and aluminum.

The stacking structure 10 of the first embodiment can be non-restrictively prepared according to the following steps:

(1) providing a substrate;

(2) coating the substrate with a plurality of silver nanowires;

(3) forming a silver nanowire layer by providing an ITO on the silver-nanowires-coated substrate by sputter deposition; and (4) covering a metal layer on the silver nanowire layer.

Second Embodiment

Figure 2:
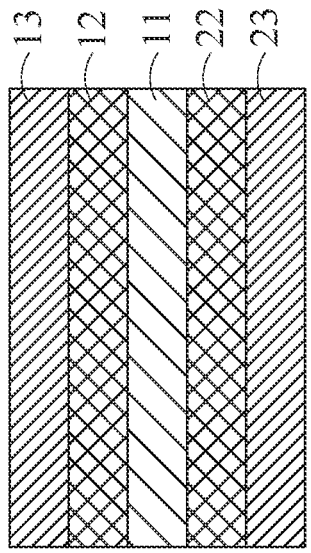
FIG. 2 is a schematic sectional view of a stacking structure according to a second embodiment of the present disclosure.

FIG. 2 is a schematic sectional view of a stacking structure 20 according to a second embodiment of the present disclosure. Like the stacking structure 10 in the first embodiment, the stacking structure 20 in the second embodiment also includes a substrate 11, a silver nanowire layer 12 provided on a top of the substrate 11, and a metal layer 13 provided on a top of the silver nanowire layer 12. The silver nanowire layer 12 includes a plurality of silver nanowires and an indium tin oxide (ITO) covered on the plurality of silver nanowires.

Compared to the stacking structure 10 in the first embodiment, the stacking structure 20 according to the second embodiment further includes a second silver nanowire layer 22 provided on an underside of the substrate 11 and a second metal layer 23 provided on an underside of the second silver nanowire layer 22. The second silver nanowire layer 22 includes a plurality of silver nanowires and an indium tin oxide (ITO) covered on the plurality of silver nanowires.

In the stacking structure 20 according to the second embodiment, since the ratio of an overall thickness of the second silver nanowire layer 22 to a thickness of the ITO, the overall thickness of the second silver nanowire layer 22, and the material for forming the second metal layer 23 are the same as those for the silver nanowire layer 12 and the metal layer 13 in the first embodiment, they are not repeatedly described herein.

In the stacking structure 20 according to the second embodiment, the second silver nanowire layer 22 and the second metal layer 23 can be prepared in the same steps as described in the first embodiment.

Third Embodiment

Figure 3:
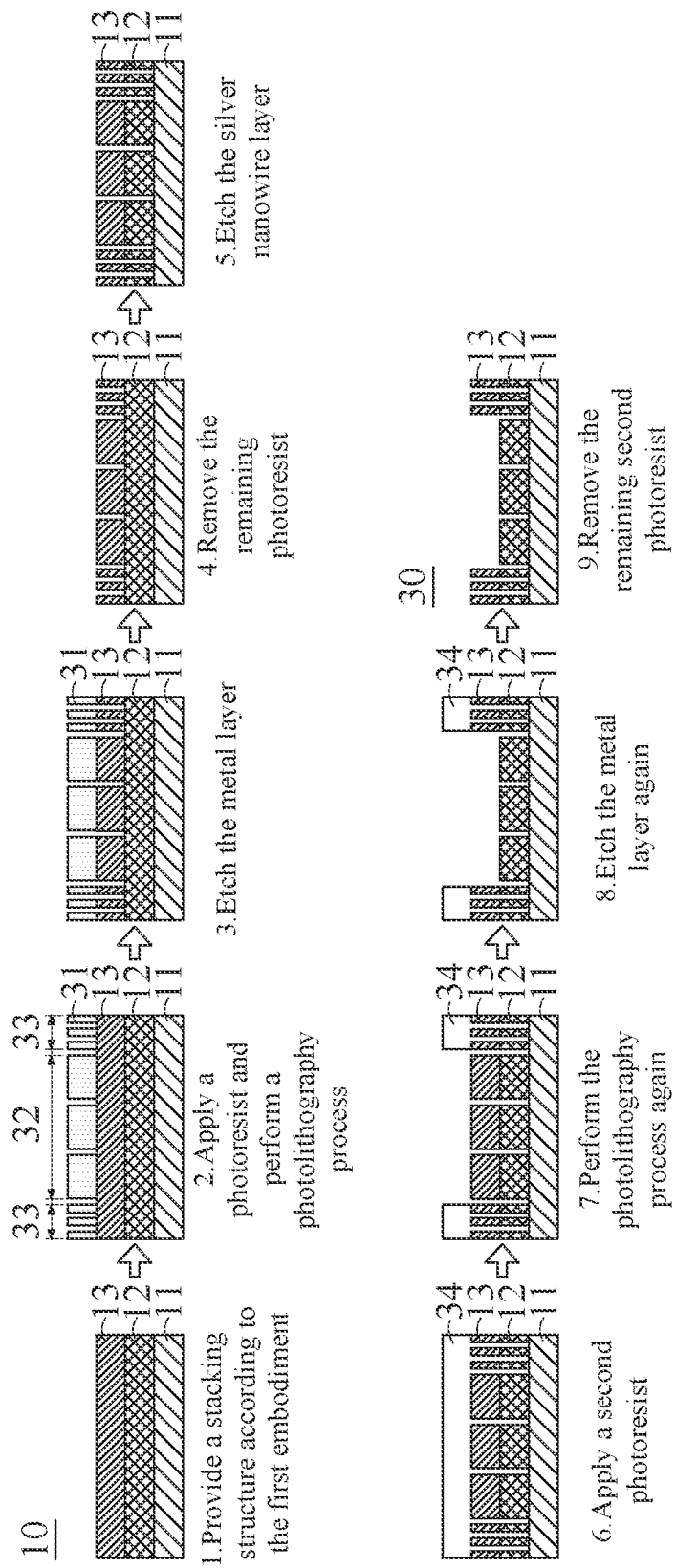
FIG. 3 is a pictorial flowchart showing the steps of preparing a touch sensor according to a third embodiment of the present disclosure.

FIG. 3 is a pictorial flowchart showing the steps of preparing a touch sensor 30 according to a third embodiment of the present disclosure. As shown in FIG. 3, the touch sensor 30 in the third embodiment includes the stacking structure 10 described in the first embodiment, and the stacking structure 10 is patterned to meet different requirements of the touch sensor 30.

As shown in the flowchart of FIG. 3, the steps for preparing the touch sensor 30 include:

1. providing the stacking structure 10 described in the first embodiment;

2. applying a photoresist 31 on a top of the metal layer 13 and performing a photolithography process on the photoresist 31; a pattern of the applied photoresist 31 defines an operating area 32 located at a central area of the stacking structure 10 and a trace area 33 located at outer sides of the stacking structure 10;

3. etching the metal layer 13;

4. removing the remaining photoresist 31;

5. etching the silver nanowire layer 12;

6. applying a second photoresist 34 on the top of the metal layer 13;

7. performing the photolithography process again on the second photoresist 34;

8. etching the metal layer 13 again; and 9. removing the remaining second photoresist 34 to complete a touch sensor 30 according to the third embodiment of the present disclosure.

Fourth Embodiment

Figure 4:
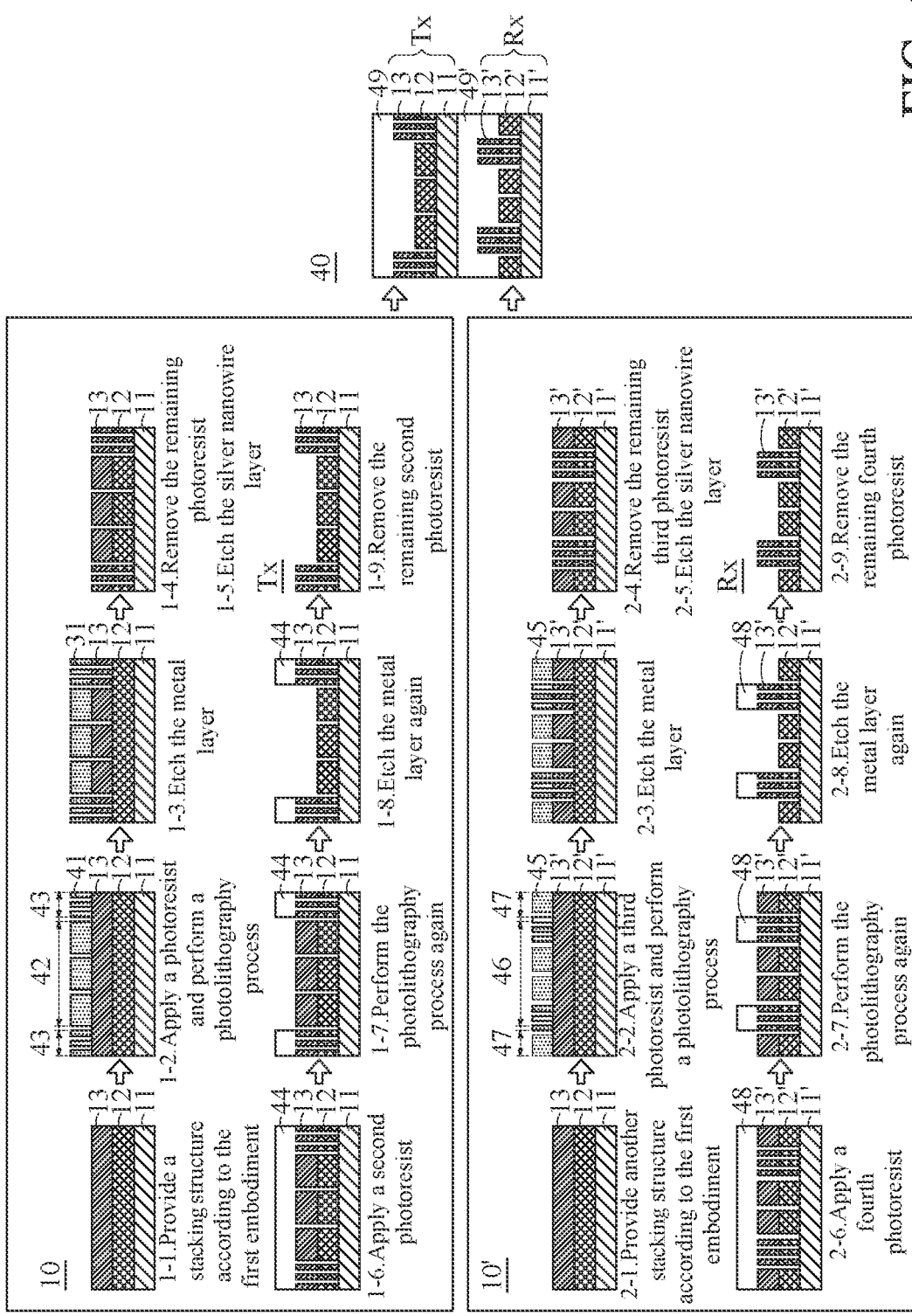
FIG. 4 is a pictorial flowchart showing the steps of preparing a touch sensor according to a fourth embodiment of the present disclosure.

FIG. 4 is a pictorial flowchart showing the steps of preparing a touch sensor 40 according to a fourth embodiment of the present disclosure. As shown, the touch sensor 40 in the fourth embodiment of the present disclosure includes two layers of the stacking structure described in the first embodiment (i.e. a stacking structure 10 and another stacking structure 10'), and the two stacking structures 10, 10' are patterned to meet different requirements of the touch sensor 40.

As shown in the flowchart of FIG. 4, the steps for preparing the touch sensor 40 in the fourth embodiment include:

1-1 providing the stacking structure 10 described in the first embodiment;

1-2 applying a photoresist 41 on a top of the metal layer 13 of the stacking structure 10 and performing a photolithography process on the photoresist 41; a pattern of the applied photoresist 41 defines an operating area 42 located at a central area of the stacking structure 10 and a trace area 43 located at outer sides of the stacking structure 10;

1-3 etching the metal layer 13;

1-4 removing the remaining photoresist 41;

1-5 etching the silver nanowire layer 12 of the stacking structure 10;

1-6 applying a second photoresist 44 on the top of the metal layer 13;

1-7 performing the photolithography process again on the second photoresist 44;

1-8 etching the metal layer 13 again;

1-9 removing the remaining second photoresist 44 to complete a driving electrode $T_x$ for the touch sensor 40 according to the fourth embodiment of the present disclosure;

2-1 providing another stacking structure 10' described in the first embodiment;

2-2 applying a third photoresist 45 on a top of the metal layer 13' of the stacking structure 10' and performing a photolithography process on the third photoresist 45; a pattern of the applied third photoresist 45 defines an operating area 46 located at a central area of the stacking structure 10' and a trace area 47 located at outer sides of the stacking structure 10';

2-3 etching the metal layer 13';

2-4 removing the remaining third photoresist 45;

2-5 etching the silver nanowire layer 12' of the stacking structure 10';

2-6 applying a fourth photoresist 48 on the top of the metal layer 13';

2-7 performing the photolithography process again on the fourth photoresist 48;

2-8 etching the metal layer 13' again;

2-9 removing the remaining fourth photoresist 48 to complete a sensing electrode $R_x$ for the touch sensor 40 according to the fourth embodiment of the present disclosure; and 3-1 providing a first covering layer 49 and a second covering layer 49' on a top of the driving electrode $T_x$ formed in the step 1-9 and the sensing electrode $R_x$ formed in the step 2-9, respectively; and superposing the driving electrode $T_x$ covered with the first covering layer 49 on the sensing electrode $R_x$ covered with the second covering layer 49' to complete the touch sensor 40 of the fourth embodiment.

Fifth Embodiment

Figure 5:
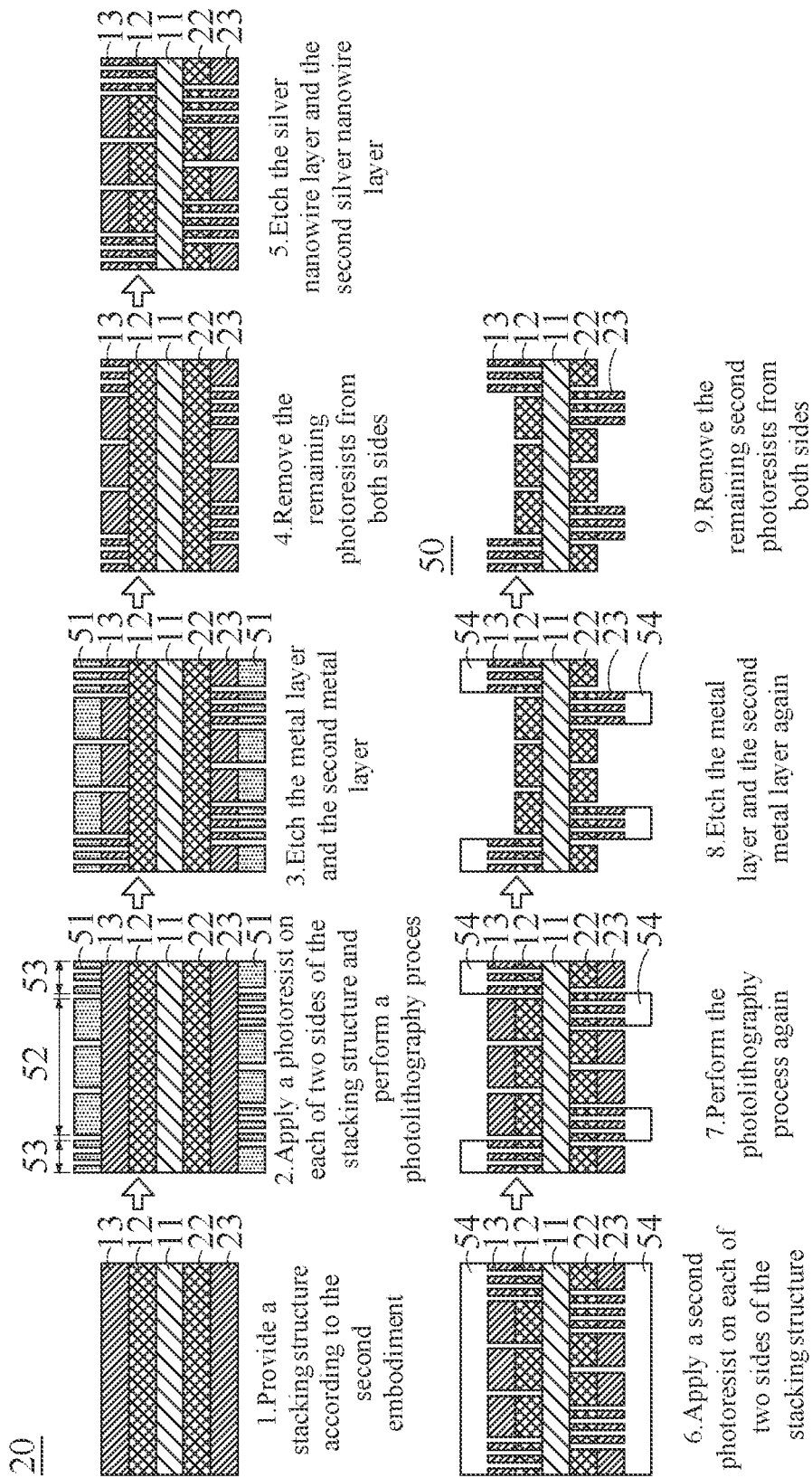
FIG. 5 is a pictorial flowchart showing the steps of preparing a touch sensor according to a fifth embodiment of the present disclosure.

FIG. 5 is a pictorial flowchart showing the steps of preparing a touch sensor 50 according to a fifth embodiment of the present disclosure. As shown in FIG. 5, the touch sensor 50 in the fifth embodiment includes the stacking structure 20 described in the second embodiment, and the stacking structure 20 is patterned to meet different requirements of the touch sensor 50.

As shown in the flowchart of FIG. 5, the steps for preparing the touch sensor 50 in the fifth embodiment include:

1. providing the stacking structure 20 described in the second embodiment;

2. applying a photoresist 51 on a top of the metal layer 13 of the stacking structure 20 and on an underside of the second metal layer 23 of the stacking structure 20 and performing a photolithography process on the upper and the lower photoresist 51, wherein patterns of the applied photoresists 51 define an operating area 52 located at a central area of the stacking structure 20 and a trace area 53 located at outer sides of the stacking structure 20;

3. etching the metal layer 13 and the second metal layer 23;

4. removing the remaining photoresists 51 from both sides of the stacking structure 20;

5. etching the silver nanowire layer 12 and the second silver nanowire layer 22 of the stacking structure 20;

6. applying a second photoresist 54 on the top of the metal layer 13 and on the underside of the second metal layer 23;

7. performing the photolithography process again on the upper and the lower second photoresist 54;

8. etching the metal layer 13 and the second metal layer 23 again; and 9. removing the remaining second photoresists 54 to complete the touch sensor 50 according to the fifth embodiment of the present disclosure.

Comparative Example 1

To find out how the ITO included in the silver nanowire layer of the stacking structure of the present disclosure influences the ability of ESD prevention of the stacking structure, a stacking structure is prepared according to the first embodiment with the ITO in the silver nanowire layer being omitted and replaced by a conventional nonconductive acrylic resin material. The stacking structure so prepared is used as a comparative example 1.

Test Example 1

In test example 1, a stacking structure according to the first embodiment and a stacking structure according to the comparative example 1 are used to find out which one has better performance with respect to ESD prevention. Both stacking structures have their metal layer removed therefrom and are subjected to an electrostatic discharge stress produced by an ESD simulation device. In the case of a stacking structure with better anti-electrostatic ability, only relatively minor damage (or a relatively small change in the resistance value) will be caused by the ESD stress. On the other hand, in the case of a stacking structure with inferior anti-electrostatic ability, relatively serious damage will be caused by the ESD stress, resulting in an increased resistance value or even broken silver nanowires of the stacking structure.

Test results from the test example 1 are shown below in Table 1 (unit of measurement: ohm):

TABLE 1

| | Test voltage (kV) | | | | | | | |
|---|---|---|---|---|---|---|---|---|
| | 0 | 1 | 3 | 5 | 8 | 10 | 15 | 30 |
| Comparative example 1 | 1370 | 1376 | 1470 | 1530 | X | X | X | X |

TABLE 1-continued

| | Test voltage (kV) | | | | | | | |
|---|---|---|---|---|---|---|---|---|
| | 0 | 1 | 3 | 5 | 8 | 10 | 15 | 30 |
| First Embodiment | 25 | 24.6 | 24.63 | 25 | 24.52 | 24.76 | 24.70 | 25.30 |

As can be seen from the test results in Table 1, the stacking structure according to the first embodiment apparently has a superior anti-ESD ability than that of the stacking structure according to the comparative example 1. This is because the stacking structure of the first embodiment uses the ITO in the silver nanowire layer instead of the conventional nonconductive resin.

Test Example 2

In test example 2, a stacking structure is prepared according to the first embodiment with the silver nanowire layer thereof being controlled to have an overall thickness of 40 nm and a sheet resistance of 50 ops, and the stacking structure so prepared is used in the test example 2. In the test example 2, sample stacking structures used are different from one another only in their ratios of the overall thickness of the silver nanowire layer to the thickness of the ITO.

TABLE 2

| Thickness of ITO | 0 | 1 kV | 8 kV | 15 kV | 30 kV |
|---|---|---|---|---|---|
| 0 nm | 1.64 kΩ | 1.7 kΩ | x | x | x |
| 5 nm | 0.63 kΩ | 0.69 kΩ | 0.84 kΩ | 90 kΩ | x |
| 17 nm | 0.1 kΩ | 0.1 kΩ | 0.095 kΩ | 0.113 kΩ | 0.111 kΩ |

As shown in Table 2, when the silver nanowire layers are the same in their overall thickness, the stacking structures having an ITO thickness larger than or equal to 5 nm can show good anti-ESD ability. The influence of the ITO thickness on the visibility of the stacking structures is further examined. It is found that the stacking structures can have good anti-ESD ability and good visibility at the same time when the ITO thickness ranges from 5 to 17 nm; and that the visibility of the stacking structures is reversely affected when the ITO thickness is larger than 17 nm.

On the whole, in the stacking structures according to the present disclosure, the overall thickness of the silver nanowire layer can range from 40 to 120 nm and the thickness of the ITO can range from 5 to 17 nm. Therefore, the ratio of the overall thickness of the silver nanowire layer of the stacking structure to the thickness of the ITO ranges from 40:17 to 120:5. In other words, the overall thickness of the silver nanowire layer can be 2.35 to 24 times as thick as the thickness of the ITO.

In conclusion, the stacking structure and the touch sensor including same according to the present disclosure provide at least the following advantageous technical effects:

1. In the stacking structure of the present disclosure, an ITO is used in the silver nanowire layer instead of the conventional nonconductive resin, enabling easy selectivity of etchant; that is, an etchant that etches the metal layer without damaging the silver nanowires and the ITO can be used in the process of etching the metal layer, and another etchant that etches the silver nanowires and the ITO without etching the metal layer can be used in the process of etching the silver nanowires and the ITO.

2. By combining a network scalability provided by the silver nanowires with a continuous conduction provided by the ITO, the stacking structure of the present disclosure shows reduced contact impedance, good ESD prevention, and upgraded tolerance in the reliability analysis without adversely affecting the optical conditions of the stacking structure.

3. In response to the ITO conductive thin film that is currently a market mainstream, the stacking structure of the present disclosure can quickly introduce the silver nanowire thin film technique into the existing ITO optical thin film manufacturing process without causing too many changes in the production line and manufacturing process, so as to combine the advantages of these two types of materials while give the stacking structure even better optical and conducting properties.

While the present disclosure has been described by means of specific embodiments, numerous modifications and variations can be made thereto by those skilled in the art without departing from the scope and spirit of the present disclosure set forth in the claims.

What is claimed is:

1. A stacking structure, comprising:
   a substrate;
   a silver nanowire layer provided on a top of the substrate; and
   a metal layer provided on a top of the silver nanowire layer;
   wherein the silver nanowire layer comprises:
      a plurality of silver nanowires, and
      an indium tin oxide (ITO) covered on the plurality of silver nanowires;
   wherein the silver nanowires are embedded in the ITO; and
   wherein the silver nanowire layer has an overall thickness that is 2.35 to 24 times as thick as a thickness of the ITO.

2. The stacking structure according to claim 1, wherein the overall thickness of the silver nanowire layer ranges from 40 to 120 nm.

3. The stacking structure according to claim 2, wherein the thickness of the ITO in the silver nanowire layer ranges from 5 to 17 nm.

4. The stacking structure according to claim 1, wherein the silver nanowire layer has a sheet resistance ranging from 5 to 100 ohms per square (ops).

5. The stacking structure according to claim 1, further comprising:
   a second silver nanowire layer provided on an underside of the substrate; and
   a second metal layer provided on an underside of the second silver nanowire layer;
   wherein the second silver nanowire layer comprises:
      a plurality of silver nanowires, and
      an ITO covered on the plurality of silver nanowires; and
   wherein the second silver nanowire layer has an overall thickness that is 2.35 to 24 times as thick as a thickness of the ITO of the second silver nanowire layer.

6. A touch sensor, comprising:
   the stacking structure according to claim 1.

7. The touch sensor according to claim 6, wherein the silver nanowire layer and the metal layer of the stacking structure are patterned.

8. The touch sensor according to claim 6, wherein the touch sensor includes two of the stacking structures according to claim 1, and the silver nanowire layers and the metal layers of the two stacking structures are patterned.

9. A touch sensor, comprising:
the stacking structure according to claim 5, wherein the silver nanowire layer, the second silver nanowire layer, the metal layer, and the second metal layer are patterned.

10. The stacking structure according to claim 2, wherein the silver nanowire layer has a sheet resistance ranging from 5 to 100 ohms per square (ops).

11. The stacking structure according to claim 3, wherein the silver nanowire layer has a sheet resistance ranging from 5 to 100 ohms per square (ops).

12. The stacking structure according to claim 2, further comprising:
a second silver nanowire layer provided on an underside of the substrate; and
a second metal layer provided on an underside of the second silver nanowire layer;
wherein the second silver nanowire layer comprises:
a plurality of silver nanowires, and
an ITO covered on the plurality of silver nanowires; and
wherein the second silver nanowire layer has an overall thickness that is 2.35 to 24 times as thick as a thickness of the ITO of the second silver nanowire layer.

13. The stacking structure according to claim 3, further comprising:
a second silver nanowire layer provided on an underside of the substrate; and
a second metal layer provided on an underside of the second silver nanowire layer;
wherein the second silver nanowire layer comprises:
a plurality of silver nanowires, and
an ITO covered on the plurality of silver nanowires; and
wherein the second silver nanowire layer has an overall thickness that is 2.35 to 24 times as thick as a thickness of the ITO of the second silver nanowire layer.

14. A touch sensor, comprising:
the stacking structure according to claim 2.

15. A touch sensor, comprising:
the stacking structure according to claim 3.

16. A touch sensor, comprising:
the stacking structure according to claim 4.

17. A touch sensor, comprising:
the stacking structure according to claim 10.

18. A touch sensor, comprising:
the stacking structure according to claim 11.

19. A touch sensor, comprising:
the stacking structure according to claim 12.

20. A touch sensor, comprising:
the stacking structure according to claim 13.

* * * * *